(12) United States Patent
Abe et al.

(10) Patent No.: US 6,763,177 B1
(45) Date of Patent: Jul. 13, 2004

(54) NON-LINEAR VIDEO EDIT SYSTEM

(75) Inventors: Koichi Abe, Tokyo (JP); Yasushi Okamoto, Tokyo (JP); Koji Matsuura, Kanagawa (JP); Shogo Tsubouchi, Kanagawa (JP)

(73) Assignee: Grass Valley Group, Inc., Nevada City, CA (US)

( * ) Notice: Subject to any disclaimer, the term of this patent is extended or adjusted under 35 U.S.C. 154(b) by 0 days.

(21) Appl. No.: 09/570,167

(22) Filed: May 11, 2000

Related U.S. Application Data

(63) Continuation-in-part of application No. PCT/JP98/05066, filed on Nov. 11, 1998.

(30) Foreign Application Priority Data

Nov. 11, 1997 (JP) .............................................. 9-325344

(51) Int. Cl.$^7$ .......................... G11B 27/00; G11B 27/02; G06T 11/40
(52) U.S. Cl. ........................... 386/55; 386/52; 386/124; 386/125
(58) Field of Search ............................. 386/52, 55, 95, 386/125, 126; G11B 27/00, 27/02; G06T 11/40

(56) References Cited

U.S. PATENT DOCUMENTS 5,051,845 A * 9/1991 Gardner et al. ................ 386/52
5,367,341 A * 11/1994 Schnorf ....................... 348/616
6,011,894 A * 1/2000 Nakamura et al. ............. 386/46
6,324,336 B1 * 11/2001 Kanda .......................... 386/52

* cited by examiner

Primary Examiner—Chris Kelley
Assistant Examiner—Jamie Vent
(74) Attorney, Agent, or Firm—Joseph S. Tripoli; Harvey D. Fried; Robert B. Levy

(57) ABSTRACT

When a played scene of a VCR (sequential access recorder) (90) is overwritten or added to the play list derived from the cut edit of the video scenes already stored in a disk (random access recorder) (140) according to the first instruction of a user, a selector (96) switches the play output of the disk following the play list and said played scene of the VCR to provide it to a monitor (6A) so that the user can confirm the edit result during the recording in real time. If there is the second instruction (VIEW instruction) during the recording, it plays the same edit result of the disk (140) again based on the renewed temporary play list to provide it to the monitor (6A) without interrupting the recording. On this occasion, it approves the user to change the play speed and stops advancing the play if the user try to play beyond the recorded point. Then, the user can confirm the recorded video portion without waiting the completion of the recording and without interrupting the recording even during the recording from the external VCR.

15 Claims, 13 Drawing Sheets

PLAY LIST 80

| NO. | CASSETTE NAME | SCENE NAME | IN | OUT | DURATION | SPEED | V | A1 | A2 | A3 | A4 |
|---|---|---|---|---|---|---|---|---|---|---|---|
| 1 | CASSETTE1 | SCENE1 | 00:01:30:00 | 00:02:50:00 | 00:01:20:00 | 100% | | | | | |
| 2 | CASSETTE1 | SCENE2 | 00:03:15:00 | 00:03:55:00 | 00:00:40:00 | 100% | | | | | |
| 3 | CASSETTE1 | SCENE3 | ⋯ | ⋯ | ⋯ | 50% | | | | | |
| 4 | CASSETTE3 | SCENE8 | ⋯ | ⋯ | ⋯ | 100% | | | | | |
| ⋯⋯ | ⋯⋯ | ⋯⋯ | ⋯⋯ | ⋯⋯ | ⋯⋯ | ⋯⋯ | | | | | |

(A) EXEC (B) VIEW IN EXEC (C) EXEC (SLOW SETTING)

(A) CASSETTE 1

(B) CASSETTE X (A)

| CASSETTE NAME | SCENE NAME | IN | OUT |
|---|---|---|---|
| CASSETTE 1 | SCENE A | AD1 | AD4 |
| CASSETTE 1 | SCENE B | AD5 | AD6 |

(B)

| CASSETTE NAME | SCENE NAME | IN | OUT |
|---|---|---|---|
| CASSETTE 1 | SCENE A | AD1 | AD2 |
| CASSETTE X | SCENE X | AD8 | AD9 |
| CASSETTE 1 | SCENE A | AD3 | AD4 |
| CASSETTE 1 | SCENE B | AD5 | AD6 |

NON-LINEAR VIDEO EDIT SYSTEM

CROSS-REFERENCE TO RELATED APPLICATION

This is a continuation-in-part of International Application No. PCT/JP98/05066 filed Nov. 11, 1998, the entire disclosure of which is hereby incorporated by reference herein for all purposes. Certain material in this specification is also disclosed in co-pending patent application Ser. Nos. 09/570,168 and 09/570,169, the entire disclosure of each of which is hereby incorporated by reference herein for all purposes.

TECHNICAL FIELD

The present invention relates to a video edit system used in TV broadcast, more particularly to a non-linear video edit system using a digital data recorder that features random access and nonvolatile.

BACKGROUND ART

The videocassette recorder (VCR) has been used as a video edit system for a long time. The VCR uses a magnetic tape of sequential access as a recording medium so that in order to play a scene soon after it has been after recorded, it is necessary to wait for the tape to rewind. This prevents quick response. The sequential access and the slow record and play speeds also prevent the quick edit of the already recorded video.

On the other hand, as video compression and decompression technologies have developed, a non-linear video edit system using a recording medium that features fast and random access, such as a magnetic disk, or hard disk drive, has recently begun to be used.

The non-linear video edit system has an edit function called a time line which provides a cut edit by quickly cutting out and combining arbitrary scenes of the video data that has previously been digitized and stored into the disk from external VCRs or video lines. In this process, the cutting out of scenes does not process copies of the video data, but acquires address information identifying the scenes, that is, the start and end position information that points to the locations of the scenes within the video data on the hard disk drive. In the play of the edit result, the non-linear video edit system refers to the scene ID information for reading the corresponding video data contents from the disk to play it. Such video data of the cut scenes, sequentially aligned on the time line, is called a package. This is a very smart and easy way to carry out a cut edit on the video data that has been previously stored into the disk.

It is, however, necessary to be able to carry out edits rapidly in an application such as a news broadcast, so that there may be a request to create the package by the direct edit from the external VCR. In this case, the editor plays the scenes stored in the cassette loaded into the external VCR and records (digitizes) the video data into the disk so that a package comprising those scenes is created at the same time.

Even the non-linear video edit apparatus can not reduce the time for recording the scene that is to be stored. For example, recording a scene requiring three minutes to play requires three minutes to record. The video being recorded can be confirmed or viewed on a monitor in real time, i.e. while it is being recorded. But even if a portion of interest is found or the operator misses watching a portion of interest on the monitor, the portion concerned cannot be viewed until the scene recording finishes. Of course, it is possible to view this portion by suspending the VCR, but it is then necessary to record the whole scene over again even if the viewing shows no problem. On the contrary, if the portion of interest is not viewed during the recording, but viewed after the recording is complete and a problem is found, the recording must be done again from scratch and accordingly recording time has been wasted. In some applications, such as news editing, there is no time to be lost and wasting of recording time is a serious problem. This problem becomes worse as the scene is longer.

Therefore what is desired is to provide a non-linear video edit system that uses such a random access recorder and allows a recorded video portion to be viewed without awaiting completion of the recording and without interrupting the recording even during the recording from an external VCR.

DISCLOSURE OF INVENTION

A non-linear video edit system according to the present invention has a random access recorder for recording video data, read and write means for independently executing the write and the read of the video data into/from the random access recorder, a selector for selecting one from the play outputs of an external sequential access recorder and the random access recorder to provide it to an external monitor, and a control means for controlling the read and write means and the selector. When the edit system carries out an overwriting edit or an insertion edit of a played scene from the external sequential access recorder into a package of a plurality of scenes defined by a play list having data representing the start and end positions of each video scene already stored in the random access recorder in response to a first instruction provided by a user, the control means controls the selector to select the play output of the random access recorder following the play list and said played scene of the sequential access recorder to provide it to the monitor so that the user can view the edit result in real time during the writing, and if the user provides a second instruction during the writing, the control means stops the operation of displaying the edit result in real time without interrupting the writing and again provides the same edit result based on an updated temporary play list reflecting the edit result to the monitor from the random access recorder.

According to the present invention, the user can view the written video portion without awaiting completion of the writing and without interrupting the writing even during writing from the external VCR.

In accordance with another aspect of the present invention, a non-linear video edit system has a nonvolatile random access recorder for storing digitized video data, a writing means for writing the video data into the random access recorder, a reading means operating independently of the writing means, a control means for controlling an external sequential access recorder according to user instruction and controlling the writing means and the reading means, and a selecting means controlled by the control means and for selectively providing the play output of the sequential access recorder or the play output from the reading means of the random access recorder to an external monitor. As the play output of the sequential access recorder is written over or inserted into a video scene already stored in the random access recorder, when the control means receives the designation of the overwritten portion or range or the designation of the insertion point of the insertion and the overwriting or the inserted range of the play output from the sequential access recorder to the video scene so that the writing means writes the play output of the sequential access recorder into the random access recorder, it controls the sequential access recorder to start playing from a position at a predetermined time before the start point of said designated range while it controls the reading means of the random access recorder to start playing from a position at said predetermined time before said designated range or point, and controls the selecting means to select the play output of the reading means. After that, when-the play output of the sequential access recorder reaches the start point of the designated range, the control means controls the writing means to start writing the play output of the sequential access recorder as a new video scene different from the video scene stored in the random access recorder and controls the selecting means to select the play output of the sequential access recorder. Following that, when the play output of the sequential access recorder reaches the end point of the designated range, the control means controls the writing means to stop the writing and the selector to select again the play output of the reading means. After that, when the play output of the sequential access recorder reaches a position at a predetermined time after the end point of the designated range, the reading means stops reading and the control means creates a play list identifying the respective scenes resulting from overwriting or inserting said new video scene to the video scene stored in the random access recorder on the time axis by the start and the end point data of the corresponding video scene in the random access recorder without modifying the data of the video scene stored in the random access recorder. If the control means receives an instruction from the user to confirm or view the edit result before the completion of the writing of the whole designated range of sequential access recorder, it continues writing of the play output of the sequential access recorder, creates a temporary play list reflecting the edit result, restarts reading the random access recorder from the position at said predetermined time before the start point according to the temporary play list and controls the selecting means to select the play output of the reading means.

According to this configuration, the stop timing of the play of the sequential access recorder could be any time as long as it is later than the stop of the writing. Besides, it may have the length of the scene instead of, or in addition to, one of the start and the end positions.

This configuration can also confirm the recorded video portion without awaiting completion of the writing and without interrupting the writing even during writing from the external VCR.

It would be better that the control means controls the writing of the play output of the sequential access recorder to start from a position a predetermined time before the start point of the designated range and finish at a position a predetermined time after the end position. This allows said new video scene to be recorded with margins at the beginning and end of the designated range and avoids the danger of creating a blank scene if the edit point moves.

If the user instructs an overwriting or an inserting edit of a slow play output from the sequential access recorder to the video scene recorded in the random access recorder, the control means has the sequential access recorder play at the normal speed while writing it into the random access recorder, creates said temporary play list regardless of the edit result confirmation instruction, and restarts playing to read the random access recorder from the position at said predetermined time before said start point according to the temporary play list and controls the selecting means to select the play output of the reading means so that the play of the slow scene is conducted at the designated slow speed.

This allows the user to view the edit result in real time as if it were being recorded at the slow speed while the recording is conducted at the normal speed in case of the slow play edit.

In case of playing the random access recorder according to the edit result confirmation instruction, it would be better that the control means allows the user a variable speed play operation. Similarly, in case of playing the random access recorder to provide the slow play output in the overwriting or inserting edit, it would be better that the control means allows the user a variable speed play operation. These allow the user more flexible and quick confirmation. Should the user try to play the portion beyond the currently written portion into the random access recorder, the control means stops the advance of the play until it becomes playable to prevent error operation.

BRIEF DESCRIPTION OF DRAWINGS

FIG. 8 shows an example configuration of a play list according to an embodiment of the present invention.

BEST MODE FOR CARRYING OUT THE INVENTION

Figure 1:
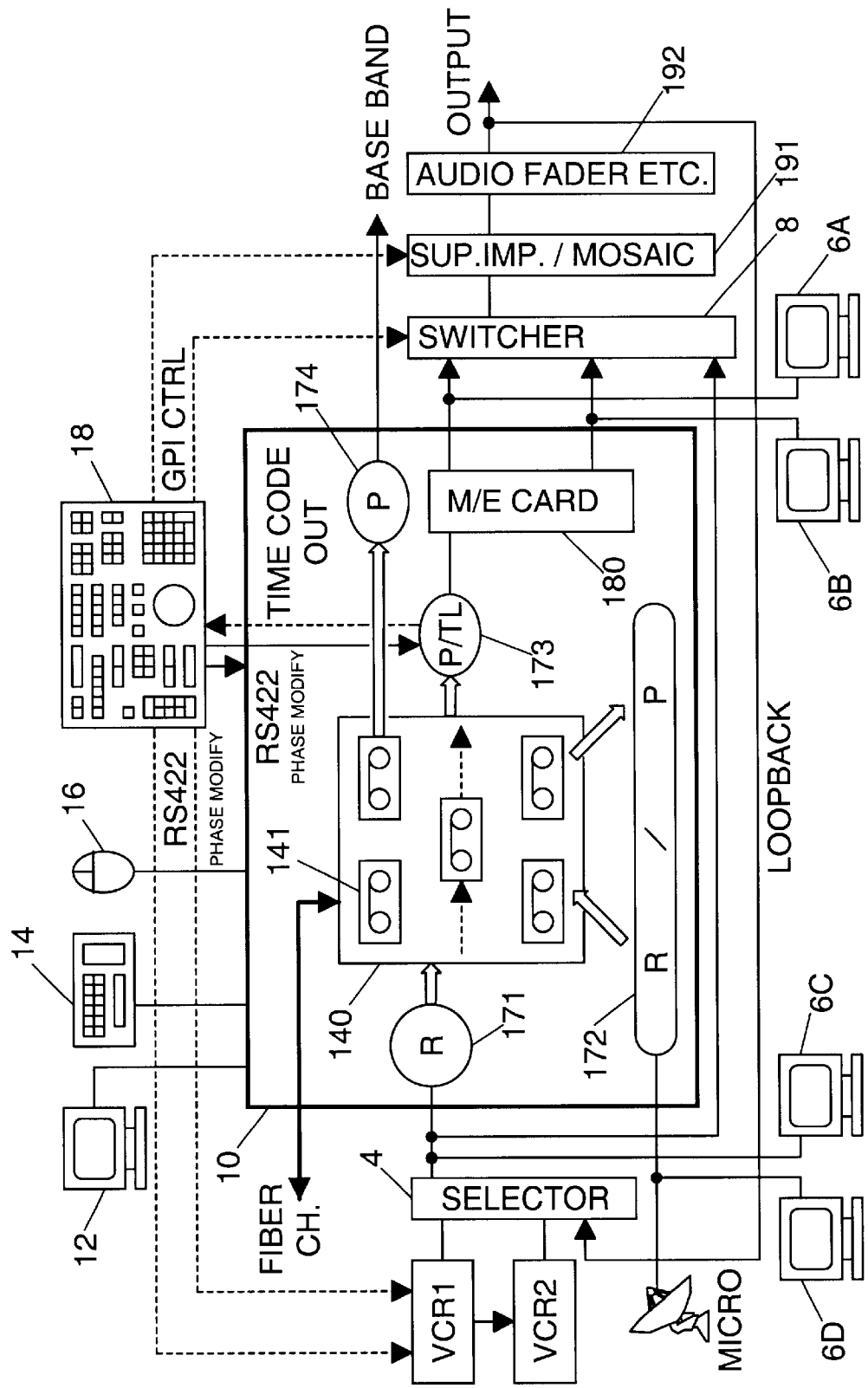
FIG. 1 shows a schematic block diagram of a video edit system according to the present invention.

Referring to the drawings, an embodiment of the present invention will be explained in detail. FIG. 1 shows a schematic overall diagram of a non-linear video edit system to which the present invention is applied. The system has a digital recording and playing apparatus 10 in the center. The digital recording and playing apparatus 10 includes a non-volatile random access recorder 140, which stores video and audio data in digital form. According to this embodiment, the random access recorder 140 may be a hard disk drive. The digital recording and playing apparatus 10 has a selector 4 in the front or input stage, to which a plurality of VCRs can be connected. Besides, it may be connected to a receiver for receiving video data by radio wave. By way of example, FIG. 1 shows a symbol representing a microwave receiver with a parabolic antenna. The selector 4 is controlled by the digital recording and playing apparatus 10. The digital recording and playing apparatus 10 has a switcher 8, a superimpose/mosaic device 191 and an audio fader 192 in the rear or output stage. The switcher 8 selectively provides two video output lines of the apparatus 10 and the output of the selector 4 to the superimpose/mosaic device 191 and the audio fader 192. The two video output lines of the digital recording and playing apparatus 10 can be displayed by monitors 6A and 6B, respectively. The video outputs of the selector 4 and the receiver can be displayed by monitors 6C and 6D, respectively. Not all monitors 6A–6D are necessary. Further, the superimpose/mosaic device 191 and the audio fader 192 are also not necessary but used in such a case as it may be desired to modify the video and the audio.

Figure 6:
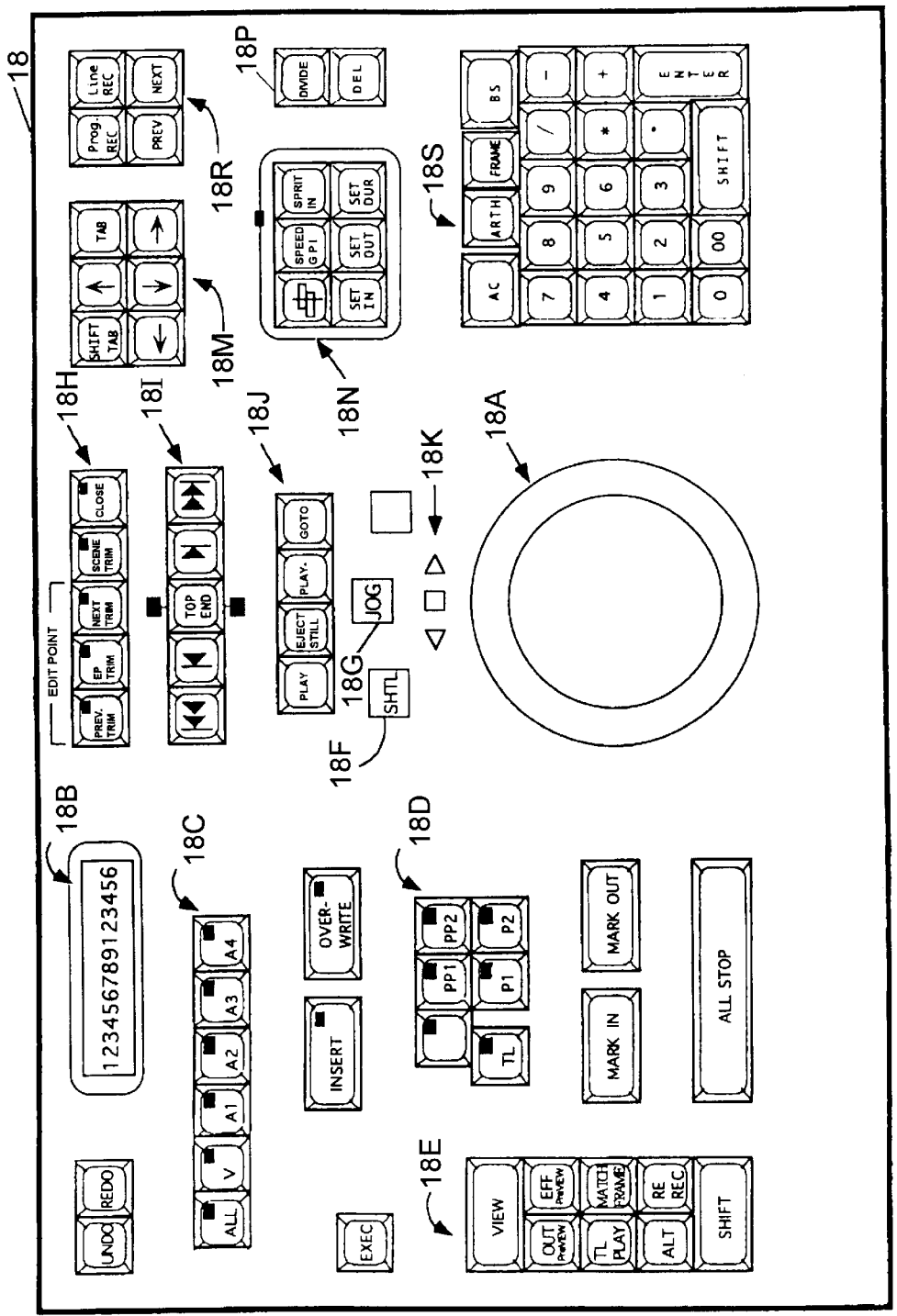
FIG. 6 shows the control panel of a operation controller used in the system of FIG. 1.

The digital recording and playing apparatus 10 is connected to a keyboard 14, a mouse 16 and a display 12. Another pointing device, such as a track-ball, may be used instead of the mouse 16. The display 12, the keyboard 14 and the mouse 16 assist the GUI (Graphical User Interface), and provide the interactive operations of record, edit and play, etc. on the display. Besides, an operation controller 18 may be connected to the digital recording and playing apparatus 10. A user can operate the digital recording and playing apparatus 10, the switcher 8, the superimpose/mosaic device 191, the audio fader 192 and an external VCR etc. by the operation controller 18 under the control of a processor, as described below. The operation controller 18 can also provide about the same GUI operations as the mouse 16 and the keyboard 14. A particular operation of the operation controller 18 is variable play speed control by a jog-dial 18A (FIG. 6). The function of the jog-dial 18A will be described blow.

The digital recording and playing apparatus 10 has resources 171–174, described below, and a mix effect (M/E) card 180 realizing the effects of wipe, dissolve etc. in addition to the random access recorder 140.

Figure 2:
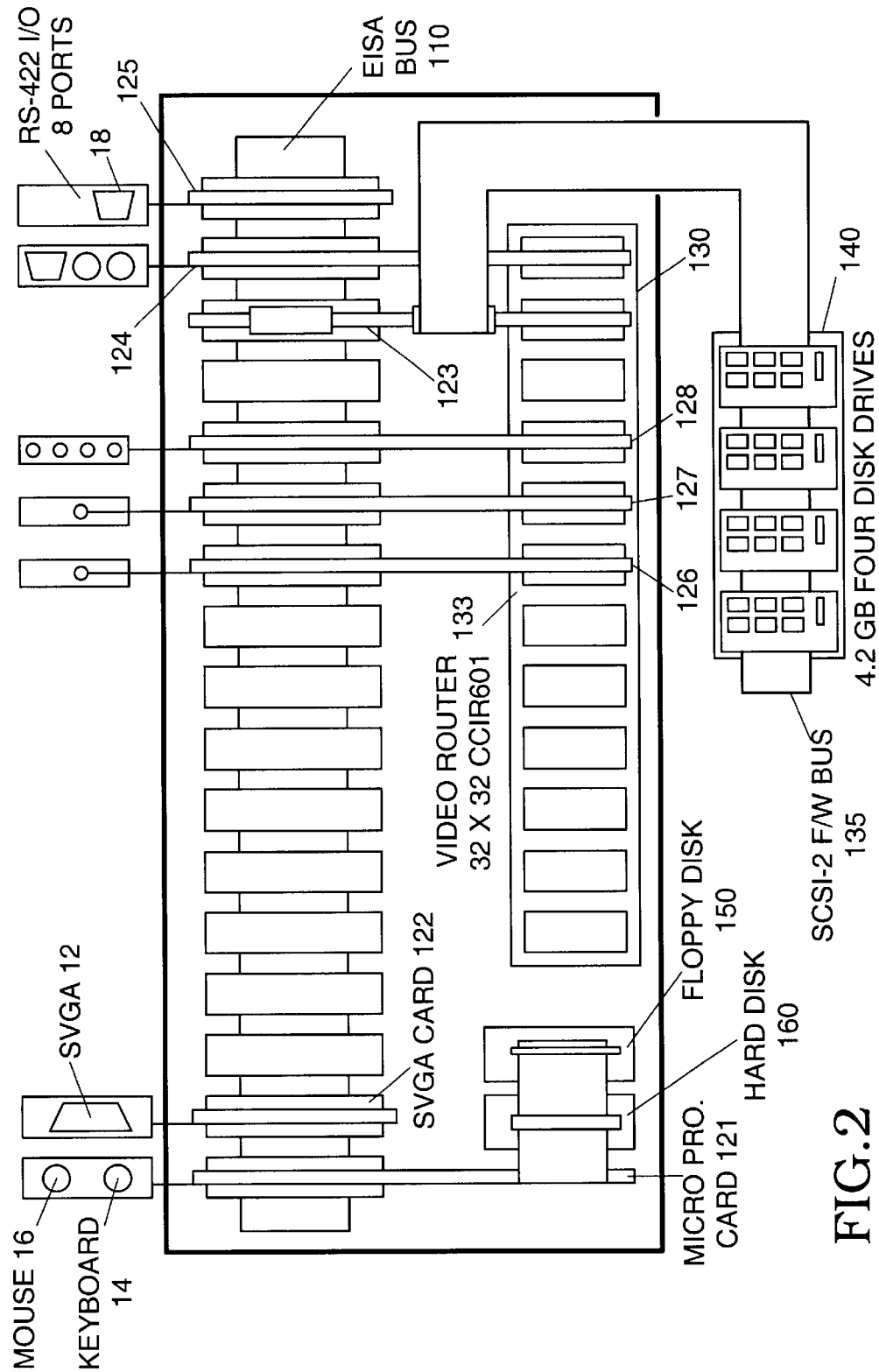
FIG. 2 shows a schematic block view of the digital recording and playing apparatus 10 in the system of FIG. 1.

FIG. 2 shows a hardware structure of the digital recording and playing apparatus 10. The digital recording and playing apparatus 10 may have an EISA bus 110 of seventeen slots and a digital video bus (CCIR601) 130 of twelve slots, in this example. A processor card 121, a display control card 122 and an RS422 interface card 125 are installed in the slots of the EISA bus 110. Besides, some of the cards may be installed in both the EISA bus 110 and the digital video bus 130. Such cards, shown in the drawings as examples, are a GEN lock reference card 124, a disk controller card 123, a video input interface card 126, a video output interface card 127 and an audio I/O (input/output) interface card 128.

The processor card 121 has a microprocessor, RAMs and an I/O interface etc. A hard disk drive 160 for the system and a floppy disk drive 150 are connected to the processor card 121, and the keyboard 14 and mouse 16 are also connected to the processor card 121. The display control card 122 has the display controller for controlling the display 12.

The video input interface card 126 receives a video signal from the external VCR, and the video output interface card 127 provides a video signal to the external monitor. The audio I/O interface card 128 has an interface for the audio input from the external VCR and for the audio output to an external speaker. FIG. 2 shows only one each of the cards 126, 127 and 128 but the system may include more than one each of these interface cards.

The digital video bus 130 includes a 32×32 video router 133 for switching the input and the output video signals. The video router 133 selects one input from the thirty-two inputs as one output from the thirty-two outputs in this example.

The disk control card 123 controls the random access recorder (video hard disk drive) 140. In this example, it controls a plurality of 4.2 G byte hard disk drives (about 16.8 G bytes in four drives in the example) via a SCSI-2 Fast/Wide bus 135.

The GEN lock reference interface card 124 is for locking an internal system clock of the non-linear video edit system to the black burst signal of the external usual NTSC or PAL. The RS422 interface card 125 provides an interface for connecting the operation controller 18.

Additional disk control cards and hard disk drives can be installed if desired. For example, FIG. 3 illustrates how the system shown in FIG. 2 can be expanded to support up to 24 disk drives.

Figure 3:
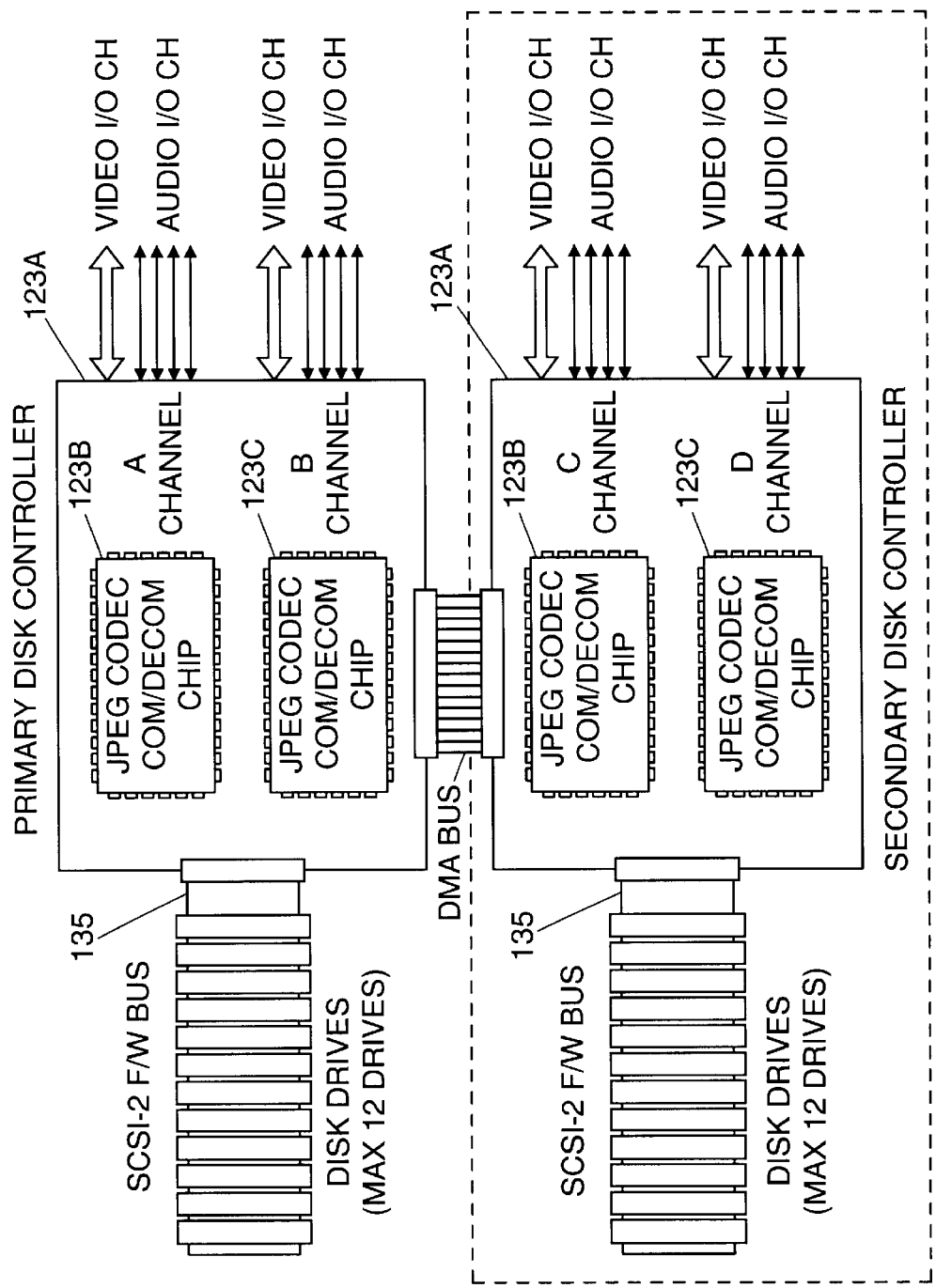
FIG. 3 shows a schematic block view of the disk controller 123a in the apparatus of FIG. 2.
Figure 4:
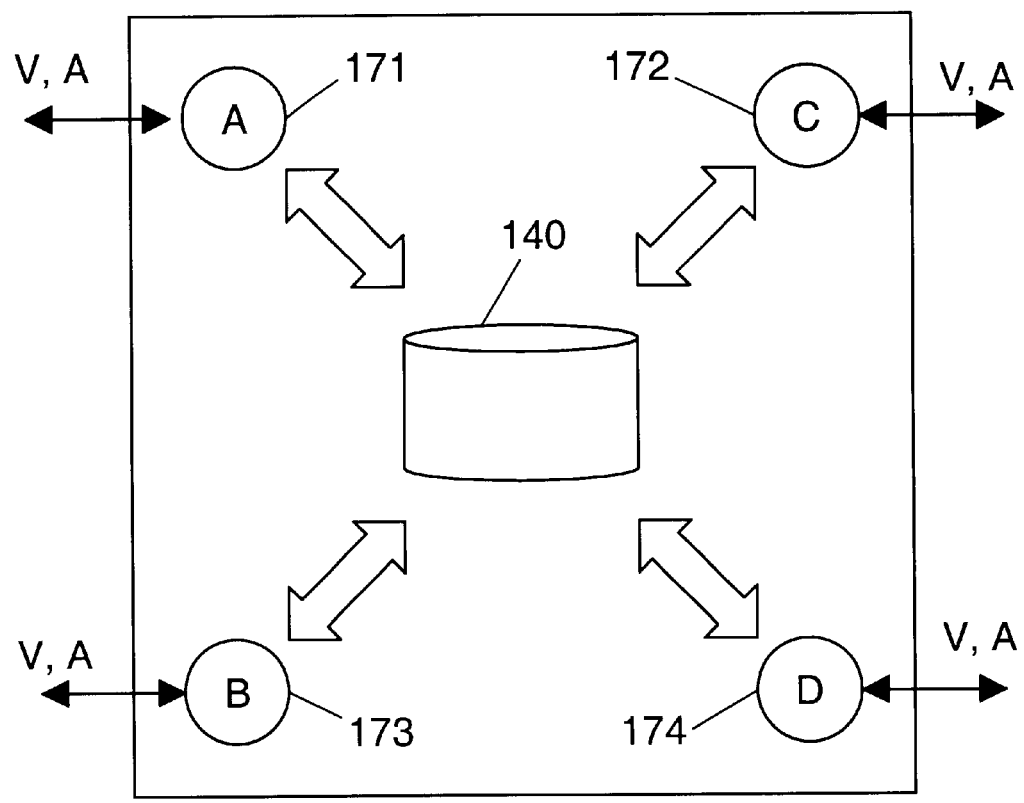
FIG. 4 shows a functional block diagram concerning the relationship between a disk and resources of working as recorders or players of the digital recording and playing apparatus in the system in FIG. 1.

FIG. 3 shows the structure of disk controllers 123A built in the disk control card 123 in the case where two disk controller cards 123 are installed. Each disk controller 123A has two JPEG (Joint Photographic Experts Group) compression/decompression chips 123B and 123C and is able to control up to twelve hard disk drives. This example uses the motion JPEG compression technology to compress and store the video into the disk for longer time recording of the video signal. Each chip has one video I/O channel and four audio I/O channels, and compresses and stores the input video and audio signals into the disk, and decompresses the compressed and stored information to output it. The present system has a plurality (four, in this example) of physical resources (JPEG compression and decompression chips) 171–174 which can work as recorders or players, respectively. These four resources correspond to A–D channels, respectively, and the number of the resources corresponds to the number of compression/decompression chips shown in FIG. 3. These resources can be allocated to different functions such as record, play or edit etc. according to the user intention. These logical video players are called, in this system, virtual recorders or virtual players (or internal players). Each resource can access the disk 140 independently, and the several resources are organized so that they execute write and read operations simultaneously to the disk 140 by well know techniques such as Striping. Then scene data, which is being written by one resource, can be read out by another resource with a delay of only a few seconds corresponding to a data buffering time to absorb a relative gap between the data write and read operations. In the example of FIG. 1, the resource 171 is exclusively used as a recorder and the resource 172 is used selectively either as a recorder or as a player. Further, the resource 173 is selectively used as a player or a time line play (or edit), and the resource 174 is exclusively used as a player. When the resource 173 operates in the time line play mode, it plays a package based on the play list, reading data from multiple virtual internal cassettes in the disk 140. When the resource 173 operates in the player mode, it plays scenes in the order that they were recorded on a virtual internal cassette, just as a VCR plays a real cassette.

The "Time Line" in this specification means a cut edit function and/or a work area thereof for combining a plurality of video scenes (and the corresponding audio scenes) on a time axis, and the product of the cut edit is called a "Play List". The package defined by the play list is played by the resource assigned to the time line (TL) but not the player. Then this resource may be called a "TL:Time Line".

Figure 5:
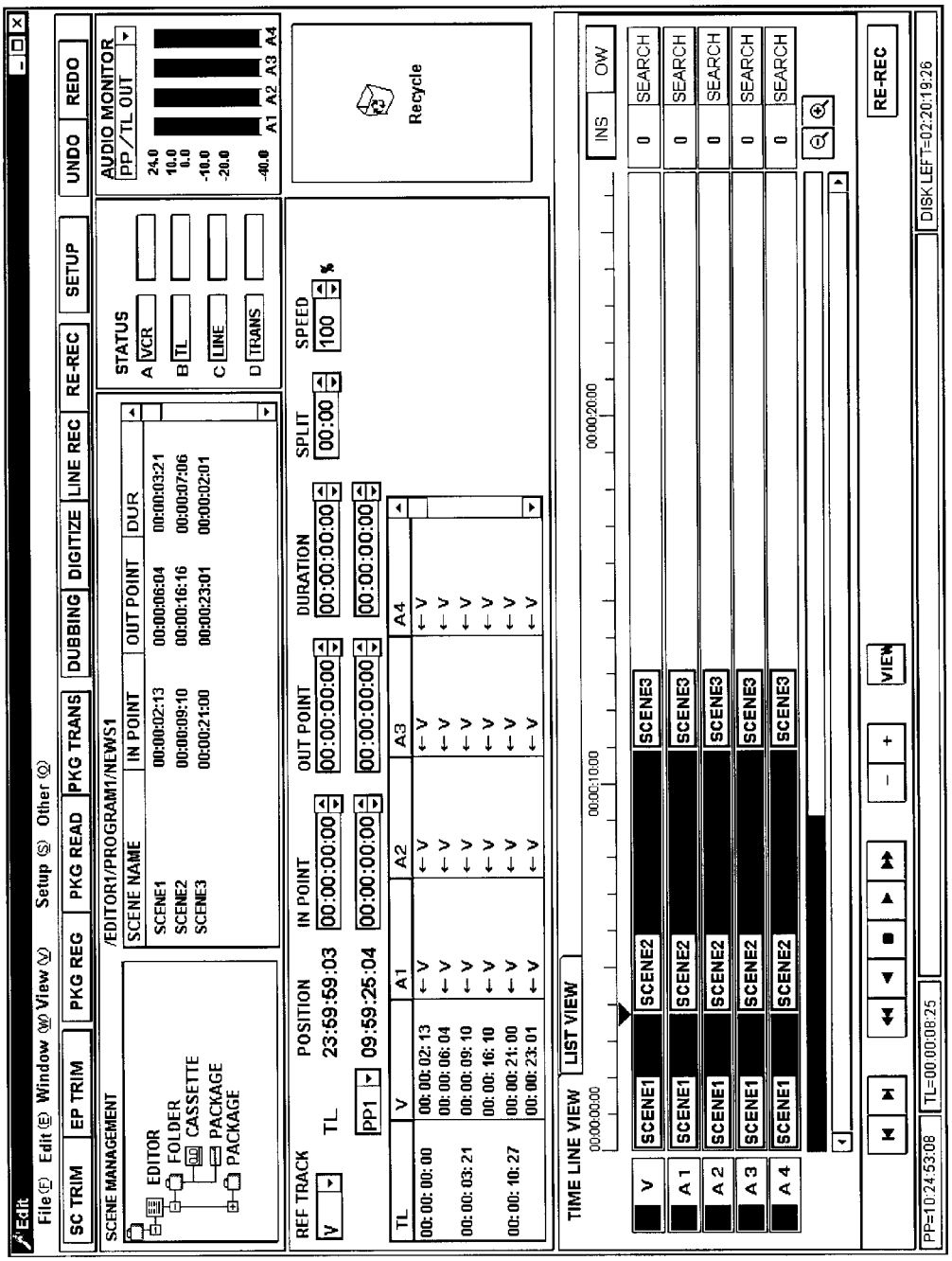
FIG. 5 shows an example view of a basic edit window, called a root window, on a display 12 according to an embodiment of the present invention.

FIG. 5 shows a screen view of a basic edit window (called "root window") on the screen of the display 12 according to an embodiment of the present invention. This screen is the default screen of the system, the image data of the frame is stored in the system disk 160, and the variable values of the data and the parameters are displayed in each area. The areas are, from the left, "Scene Management" area, "Status" area, and "Audio Monitor" area in the screen upper section, "Time Data" area in the middle section, and "Time Line" area in the lower section. The scene management area, in the screen left upper section, provides hierarchical data management for the video data (virtual video cassette, package etc.) stored in the random access storage medium. Reference to the scene management area makes it possible to provide operations of selection, move, copy, deletion etc. for a desired cassette (virtual internal cassette 141 of FIG. 1) and/or package. The right side of the scene management area is the area that provides the list view of the contents of the packages etc. selected in the scene management area.

The status area shows the current assignments to the described channels A–D, such as line, VCR, TL, transfer etc. and the statuses, such as record, play, transfer etc. In this figure, channel A is assigned to a "VCR", channel B to a "TL", channel C to a "line", and channel D to a "transfer".

The audio monitor area in the screen upper right shows the current statuses of the four audio tracks.

The time data area in the middle of the screen shows various parameters affected or controlled by the time line edit. It shows the reference track indicator, the current position of the edit object on the TL, and IN point, OUT point, duration, split and speed of the scene subject to the edit. The split generally shows a lag by which the scene cut point of the video track, which is the reference track, is shifted from that of the audio tracks. Besides, the area shows the indicator of a device as a source of the "TL" (a device PP1 is selected in the figure), and the in point, the out point and the duration of the edit object for this device.

The reference track indicator is a list box which allows the user to select any one of the tracks as the reference track. In a video edit operation the video track usually takes the key role and the user normally specifies the edit point by reference to the video material. In such case, the video track is selected as the reference track, as shown in FIG. 5, but in a suitable case another track could be selected as the reference track.

The lower portion of the time data area provides a list view of time codes on the time line of scenes constituting the package currently set to the TL and the identification information of the scenes. The left column (headed TL) in the list view shows the time codes on the time line of scenes 1, 2 and 3 illustrated in the time line area, as will be described in further detail below. The column V shows the original time codes that were generated when the video was recorded. The symbol ←V in the audio columns means the same time code as in the video column. The IN and OUT points, represented as 00:00:00:00, are in the default state, before a user edit.

There is a recycle box on the right side of the data area to throw data away.

The time line area in the lower section of the screen shows the contents of a given package in time sequential fashion, and it can mainly provide a time line edit operation. The view in the time line area is switchable between a time line (time sequential) view and a list view, which can be selected by a tab in the upper left of the time line area. The time line view is selected in the example of the figure. The time line view shows relative time from the start of the package as time codes, which have the form of hour, minute, second and field (or frame) values. It also has select buttons for the "over write" and the "insert" of the scene. The time sequential view shows one video track V and four audio tracks. Each track has segments representing the various successive scenes. Though it is not shown, it is favorable to indicate the segments that form the scene that currently receives focus by highlighting or emphasizing these segments. An inverse triangle point or cursor above the V track indicates the position of the current edit point. A bar below the A4 track indicates the proceeding status of the time line play. The scale of the horizontal axis of the time line area can be varied by using magnifying glass icons in the lower right. A scroll bar below the status bar indicates the location in the package of the portion that is displayed and the proportion of the entire package that is represented by the portion that is displayed. The lowest section of the time line area has operation buttons (<<, <, II, >, >>) for play etc., and buttons (I<, >I) for moving the focus (e.g. jump to scene start). Besides, it also has buttons (–, +) for a single frame step function and a button for a view instruction (second instruction), which is described below.

At the left end of the tracks in the time line area are buttons V, A1, A2, A3 and A4 that can be pressed to select a track to receive an edit operation. If a button is not pressed, the corresponding track cannot normally accept the edit operation.

The right end of the time line area has indicators of blank scene numbers of each track, and buttons for instructing blank scene search. It also has select buttons for selecting from insert and overwrite operations in the scene edit. The upper left of the root window frame contains a menu bar including pull-down menu items such as "File" and "Edit" etc. The "File" menu provides operations such as new file creation, save and rename etc. Below that, there is a tool bar having various operation buttons. The functions of these buttons are not pertinent to the invention described herein.

FIG. 6 shows the control panel of an example of the operation controller 18 used in the embodiment according to the present invention.

An area 18B at the upper left of the control panel is a liquid crystal display part for displaying values such as the time code, which a user can input by ten keys 18S in the lower right. The key group 18C below the liquid crystal display is for selecting the track subjected to the operation in the time line area of FIG. 5. The "EXEC" key is for instructing record execution in the time line edit described below. "INSERT" and "OVERWRITE" keys have the same functions as the insert and overwrite buttons in the time line area of FIG. 5. A key group 18D contains device select keys for selecting operation objects, in which "TL" is for the time line, "P1" and "P2" are for the two external VCRs, and "PP1" and "PP2" are for the two internal virtual players 172 and 173. A key group 18E includes a "VIEW" key having the same function as the VIEW key shown in FIG. 5, of which the function is described below. The "MARK IN" and "MARK OUT" keys below the key group 18D are used to inform the system of desired IN and OUT points while the user watches the monitor. The "ALL STOP" key is for instructing interruption of operation or working.

A key group 18H at the upper center of the operation controller 18 contains edit keys used in the time line edit.

The key group 18I contains keys for selecting a cassette or cueing up to an edit point or a scene. The key group 18J contains keys for double speed play, still picture play and search by time code.

The dial 18A for variable speed play is in the lower center of the operation controller 18. The keys 18F and 18G above the dial 18A are for instructing the dial 18A to work as a shuttle dial or a jog dial. The shuttle dial controls the play speed according to the rotation angle so that increasing the angle of rotation makes the play speed increase, and the zero angle makes the play still. The jog dial controls the play speed according to the rotation speed so that increasing the speed of rotation makes the play speed increase, and stopping rotation makes the play still. An indicator 18K indicates the current direction of the play. The user usually operates the dial 18A while watching the monitor connected to the output of the play.

A key group 18M in the upper right of the operation controller 18 contains operation keys for a GUI pointer (not shown) displayed on the screen such as FIG. 5. The GUI pointer moves the focus (the reversed portion) around the areas in sequence by "TAB" or "SHIFT TAB" keys, and the movement of the focus within a given area of the root window is done by the arrow keys. The "SET IN" and the "SET OUT" keys of a key group 18N are for fixing values of the IN and OUT points, respectively, when their values are input by the ten keys. Key groups 18R and 18P are not directly pertinent to the present invention and are not described herein.

Figure 7:
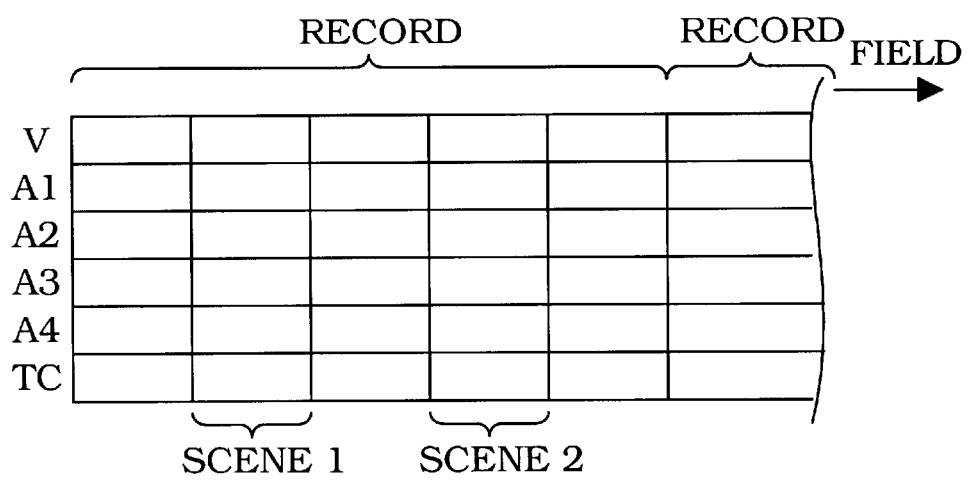
FIG. 7 shows formats of video data etc. stored in a video hard disk drive according to an embodiment of the present invention.

FIG. 7 shows a data format such as video etc. stored in the random access recorder 140 according to an embodiment of the present invention. The video data of one track, the audio data of four tracks, and the time code of one track, which are provided from the external VCR or a line input (such as the microwave receiver or a fiber optic line) etc., constitute one set, which is stored in the virtual internal cassette (corresponding to 141 of FIG. 1). When video material is recorded by a video camera using a tape cassette, the original time code is produced by the camera and is recorded with the video on the cassette. The cassette is then removed from the camera and is loaded into the external VCR, and the original time code is read as the video is played.

In this specification, a unit of sequential video (and audio) written into the internal cassette at one time is called a "record". A portion of the record stored in the internal cassette is called a "scene." The scene is identified by information of the IN point or start point and the OUT point or end point when the time line edit is carried out. The IN and OUT points are identified by the addresses in the disk, especially, by field (or frame) number in this case. If the user designates the IN and OUT data by time code, they are converted into the corresponding field numbers.

As shown in the lower section of FIG. 7, the virtual alignment of the scene identification information on the time line in time sequential fashion provides a scene cut edit. Scene combination created by such a cut edit leads to a package. The package, however, is not composed of a sequence of copies of video data (including the audio data) of a plurality of scenes. In fact, the package is a set of scene identification information as described above. The present specification refers to such a set of scene identification information as a "play list." The edit-completed package can be saved with a name by the "package registration". The registered package is stored in a package window (not shown), and is also confirmed in the scene management area.

FIG. 8 shows an example of the play list configuration. The play list has information of video V, and audio A1, A2, A3 and A4. Each plane defines, for each scene, a cassette name 81, a scene name 82, an IN point 83, an OUT point 84, duration (the length of the scene from the IN point to the OUT point) 85 and a play speed 86 of the internal cassettes storing the scenes. FIG. 8 shows the IN and OUT points in the form of time code (hour:minute:second:field) for simplicity, but the actual system may hold field numbers as the addresses in the disk. When the system plays the package, it refers to the play list and reads out the designated scenes from the disk in the prescribed sequence so that it operates as if it were playing a video cassette tape on which the scenes were recorded as a single sequence. In this manner a cut edit of the package is realized without carrying out operations (such as play and record) on copies of the video data etc., but by just combining the scene identification information. Therefore, it allows the quick creation and modification of the package based on the record already existing in the disk.

Figure 9:
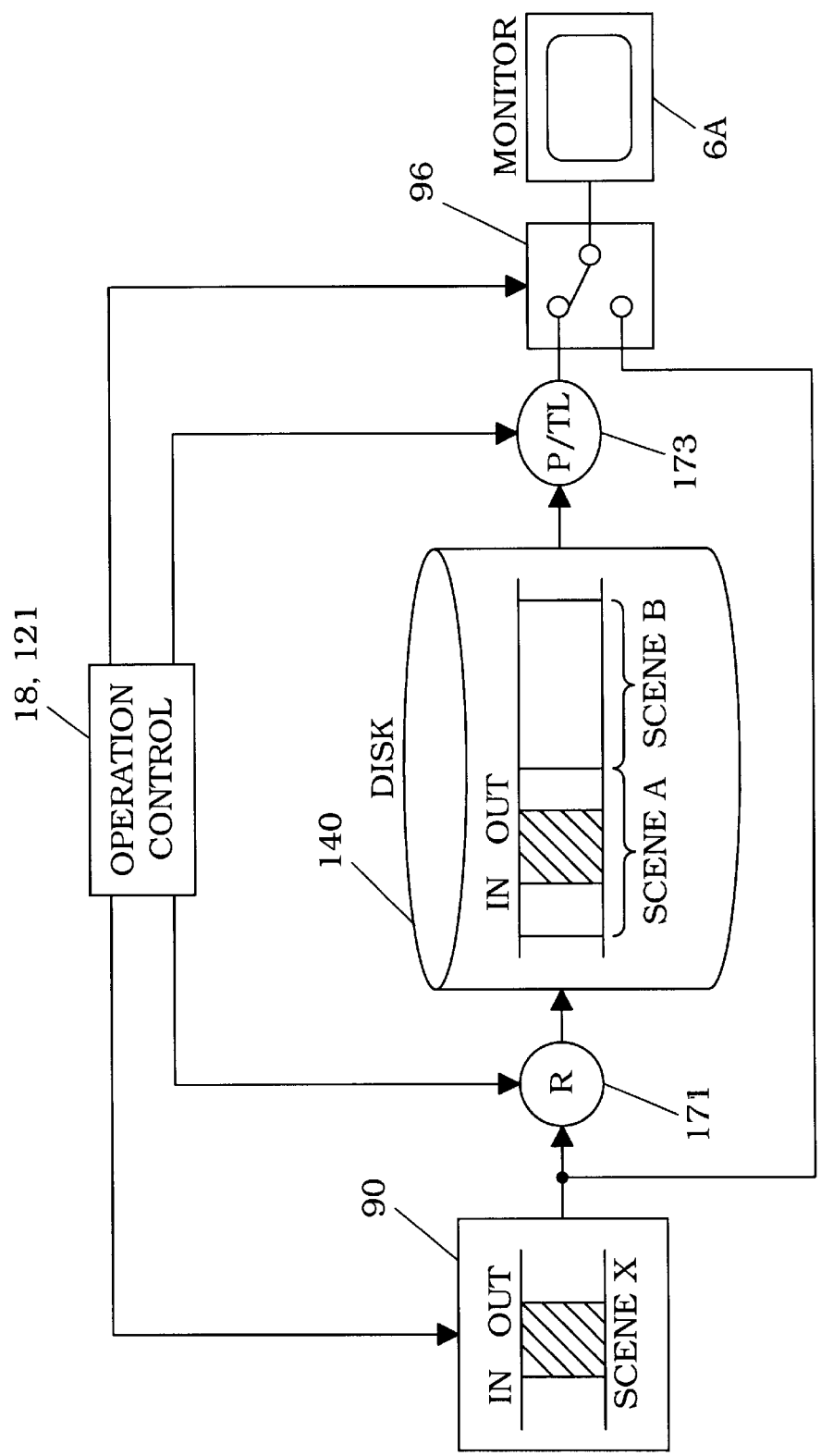
FIG. 9 shows a schematic block diagram for describing the operation of a time line edit directly from an external VCR according to an embodiment of the present invention.

Now, referring to FIG. 9, we describe the schematic diagram and the operation of the system for carrying out the time line edit directly from the VCR.

Let us assume that a specific scene (scene X) recorded on a real cassette tape loaded into an external VCR 90 is to be written over an intermediate portion of a scene A which is part of a package already existing in the disk 140 by means of the operation control block (the operation controller 18 and the processor 121). In this embodiment, two external VCRs could be simultaneously coupled to the system, which identifies them as P1 and P2. The user operation in this case is to load a desired real cassette into the external VCR 90 (here is P1), and, on the side of the digital recording and playing apparatus 10, select the package that is to be edited in the scene management area of the root window of FIG. 5, described above. Further, the user selects the device select key "P1" of the operation controller 18 and searches out the desired scene X by manipulating the dial 18A while pressing the jog key 18G or the shuttle key 18F. When the video at the start point of the scene X is displayed, the user presses the "MARK IN" button of the operation controller 18. Following that, when the video at the end point of the scene X is displayed, the user presses the "MARK OUT" button of the operation controller 18 is pressed so that the system recognizes the range (the start and end points) of scene X of the VCR 90.

Next, the "TL" button of the operation controller 18 is pressed to play the selected package on the time line. Then the package is played according to the operation of the dial 18A. The user designates the position (IN point) in scene A, at which overwriting by scene X is to start while watching the played video on the monitor 6A, and presses the "MARK IN" button at that point. The OUT point of scene A, at which overwriting by scene X ends, may be decided automatically according to the length of scene X. Instead of that, the IN point on the time line may be designated by a time code input from the ten keys, for example. Further, the duration may be designated instead of either the IN point or the OUT point. If neither the IN point nor the OUT point is designated, the current point on the time line may be treated as the default value. In case of a variable speed recording, both of the IN and the OUT points are designated.

At this state, the user presses the "EXEC" button and the system automatically copies scene X into the disk 140 and updates the play list of the package to reflect overwriting of scene X.

Figure 11:
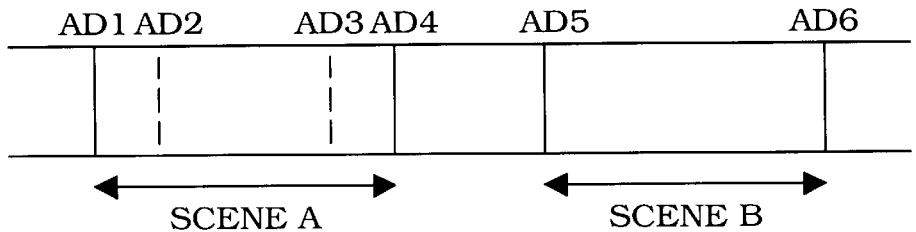
FIG. 11 shows operation charts that (A) is for a cassette 1 and (B) is for a cassette X according to an embodiment of the present invention.
Figure 11:
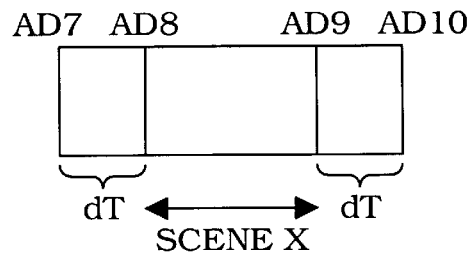

Referring to FIG. 11A, scene A is assumed to be recorded in cassette 1 of the internal cassette. The addresses of the IN and OUT points of scene A on the disk 140 are AD1 and AD4, between which the real data of the scene A is stored. As shown in FIG. 11B, the newly acquired scene X is stored in a new internal virtual cassette. Instead of that, it may alternatively be stored in cassette 1. The addresses of the IN and OUT points of scene X are AD8 and AD9. The data is, however, acquired from the position (address AD7) at a predetermined time dT before the IN point to the position (address AD10) at the predetermined time dT after the OUT point from the external VCR into the internal cassette X. The times dT before and after scene X are called "margins", and are extra portions acquired previously beyond the designated range to allow for later movement of the edit point. The margins can prevent creation of a blank scene in the case of movement of the edit point. The user can change the length of the margin. The durations of the front and the rear margins may be different instead of the same.

As described above, even if scene X is overwritten onto scene A, the actual scene A remains as it is and scene X is independently acquired into the disk. The combination (here is the overwrite) of a plurality of scenes are realized on the play list.

Figure 12:
FIG. 12 shows play list examples that (A) is before the renewal and (B) is after the renewal according to an embodiment of the present invention.

FIG. 12A shows a play list example of the package derived from the cut edit of scene A (AD1–AD4) and scene B (AD5–AD6) of cassette 1 of FIG. 11A. And FIG. 12B shows a play list example of the package produced by overwriting scene X onto scene A. The overwrite of scene X onto the intermediate portion of scene A transforms scene A into the two portions of the beginning and end of AD1–AD2 and AD3–AD4, between which the portion AD8–AD9 of scene X is inserted. The user can play the time line, including the front and the rear margins of the scene X, based on the package by giving a view instruction using the view button of the operation controller 18 after the completion of the scene X recording. That is, it plays these scenes of the video and audio in the desired combination.

Though the overwrite case is described above, the insertion case is almost the same except that the IN point of the later portion of the divided scene A is not AD3 but AD2.

Figure 10:
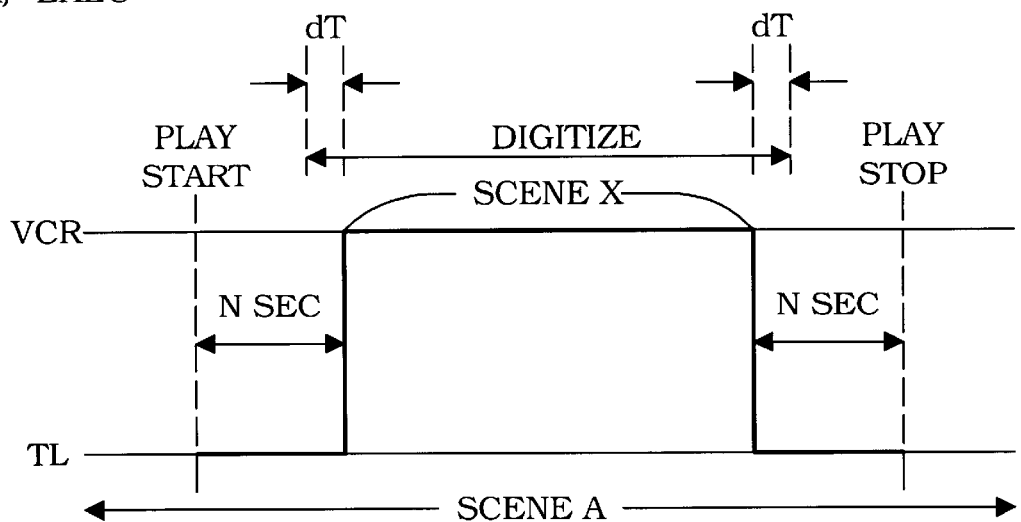
FIG. 10 shows timing charts for describing the operations of the respective processes that (A) is for an EXEC process, (B) is for a VIEW process in the EXEC process, and (C) is for the EXEC process in case of a slow setting according to an embodiment of the present invention.
Figure 10:
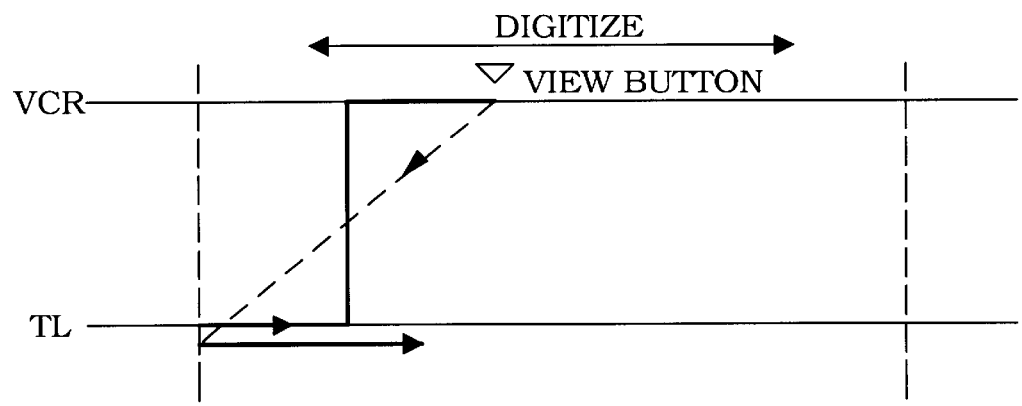
Figure 10:
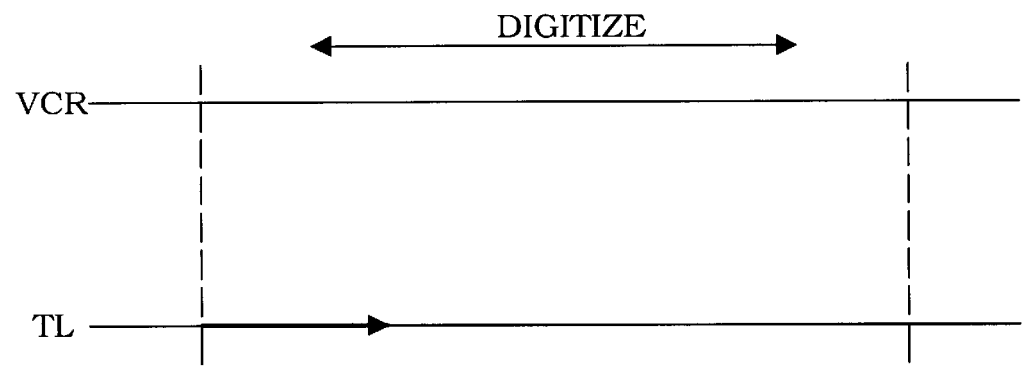

Referring to FIG. 9 again, the user can view the edit result on the monitor 6A after the completion of the scene X recording as described above, and further can view how the edit result will become under the recording in real time. FIG. 10A describes this play operation for simultaneous recording and viewing.

As shown in FIG. 10A, the "EXEC" process starts playing the VCR N (five, for example) seconds before the IN point of scene X and, at the same time, the package of the time line starts playing N seconds before the IN point. At this time, the selector 96 (FIG. 9; not shown in FIG. 1) selects the play output of the time line to provide it to the monitor 6A. When the VCR play reaches the position at a time dT before the IN point of scene X, the system starts to digitize the play output of the VCR, and the actual data of scene X is acquired into the disk as compressed JPEG data. This time dT corresponds to the front or beginning margin as described above. The selector 96 is switched to select the VCR play output during the VCR play period from the IN point to the OUT point. The play output of the time line during this period is based on the play list before the overwrite edit, but is not provided to the monitor 6A since the selector 96 is switched to the VCR side. When the VCR play reaches the OUT point, the selector 96 is switched again to select the play output of the time line. It stops digitizing the VCR play output at a time dT (corresponding to the rear margin) after the OUT point. Following that, it stops playing the time line at the position N seconds after the OUT point. As described, the user can watch the transition from the scene before scene X to scene X, and that from scene X to the next scene while the data from the VCR is digitized. The VCR play does not stop at the end of the digitization, but stops when the time line stops playing.

As described, the user can simultaneously edit and watch the edit result in real time by selectively providing the play outputs of the time line and the VCR during the direct time line edit from the VCR.

However, it is impossible for even the non-linear video edit apparatus to reduce the time for digitizing scene X, as described above, and storage of scene X requires at least the same time as the play time. Even if the user found something of interest on the video of the monitor during the digitizing, the user could not review the portion until the end of the digitizing and has to await the completion of the storage operation unless the user was willing to waste the current storage.

Therefore, the present invention allows the selector 96 to switch to the time line play side even during the storage of scene X while continuing the digitizing of scene X and, at the same time, it restarts the time line play of the package subjected to the edit from the time N seconds before the IN point. Further, it is better to update the package, as shown in FIG. 12B, after the completion of the "EXEC" process to allow the interruption caused by the "VIEW" instruction. However, in the present embodiment, when the user gives the "VIEW" instruction during the "EXEC" process, the system produces a temporary play list updated according to the overwrite of the new scene as shown in FIG. 12B. After that time, the system carries out the time line play according to the temporary play list as shown in FIG. 10B. Then it realizes the time line play of scene X during the recording, the portion being played lagging slightly behind the portion that is being stored. Besides, the selector 96 switches from the VCR side to the time line side in response to the "VIEW" instruction and the time line play goes back to and restarts from the position N seconds before the IN point. Then the digitizing of scene X precedes the start time of playing the recorded portion of scene X in the disk by a sufficient time that there is no problem of simultaneous reading and writing of scene X.

When the time line play is done according to the temporary play list, the system allows the user to manipulate the time line play at the desired speed (slow, e.g.) by the operation of the dial 18A, that is, a variable speed play operation. Then the user can confirm the existence of the desired potion by stopping at the desired portion, rewinding or changing the speed of the time line play, as the user wants. If the user should attempt to play scene X beyond the recorded position (actually, the position a few seconds before the current recording position) by giving a fastforward instruction to the time line play, the system controls the time line play (or disk read out) so as not to advance beyond the position, that is, the read out operation would not reach the unwritten portion of cassette X storing scene X.

The recording of scene X is handled by the resource 171 of FIG. 1, and the play back of the recorded scene X with some lag is handled by the resource 173.

As described, the user can immediately view the portion of interest without restriction even if it is during the scene that is being recorded from the external VCR. Besides, it does not affect the scene recording, which is executed currently. If the portion of interest has no problem, the completed package can be used as it is. On the other hand, if it has problem, the "EXEC" process can be stopped immediately and it is thereby possible to avoid wasting the time required for the process after that time.

By the way, it may be necessary to record at slow speed (half speed, e.g.) instead of at the normal speed. The slow recording of scene X is realized by designating a longer interval between the IN and the OUT points on the time line than the corresponding interval (the interval between the IN and the OUT points) of scene X.

Even with this slow setting, it is better for the nonlinear video recorder to play the external VCR at the normal speed because playing at a different speed can cause complications with the time code. For example, if the external VCR plays at one-third speed, there will be three time codes associated with each frame. Therefore, the recording is done at the normal speed, and the property of the recorded scene is set at the slow speed, later. For this purpose, the play speed 86 can be designated for each scene as shown in FIG. 8. The system confirms the play speed 86 from the play list and controls the play speed of the scene at the time of the time line play. The normal speed recording, however, makes the viewing while recording, described above, different from the desired edit result, so that it is required to view the desired edit result again by using the "VIEW" instruction after completing of the recording.

Therefore, the present embodiment makes it possible to view the edit result at the similar speed as of the edit result before completing the recording. Then, if the slow setting is in the "EXEC" process, the "VIEW" process is activated to play the concerned scene along the time line at the slow speed, and the output of this time line play is provided to the monitor 6A. That is, the selector 96 remains at the time line side as shown in FIG. 10C. On the other hand, scene X is digitized at the normal speed in the background "EXEC" process. The speed of the time line play of scene X in this "VIEW" process is slower than the normal play speed of the VCR so that the digitizing of scene X sufficiently precedes the playing of scene X. The system still allows the user to control the time line play at the desired speed by operation of the dial 18A. Therefore, the user could try to play scene X beyond the recorded position by the fast-forward instruction to the time line play. In this case, the system, however, controls the disk read-out so as not to advance beyond said position, as described above.

Figure 13:
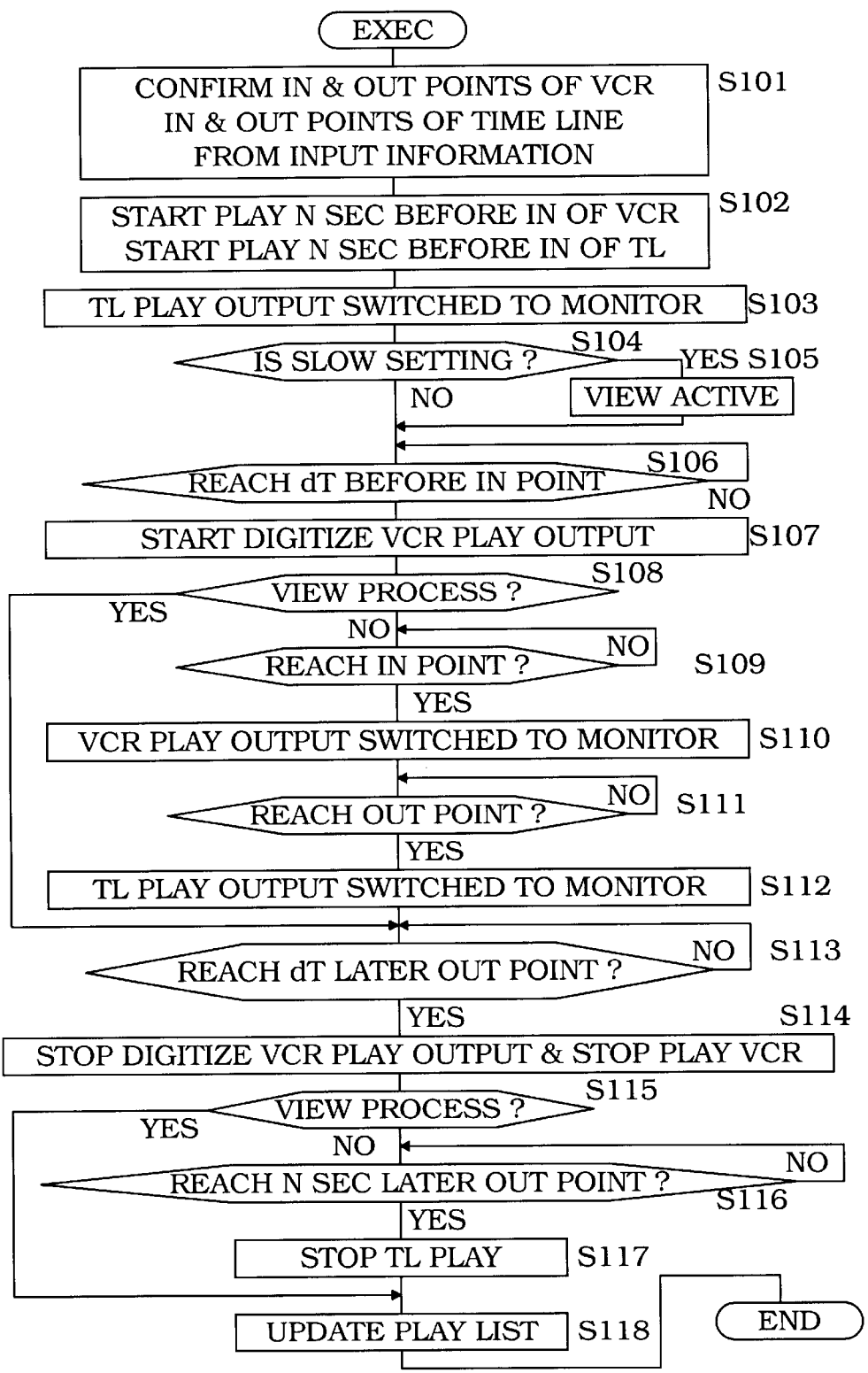
FIG. 13 shows an example flow chart of the EXEC process according to an embodiment of the present invention.
Figure 14:
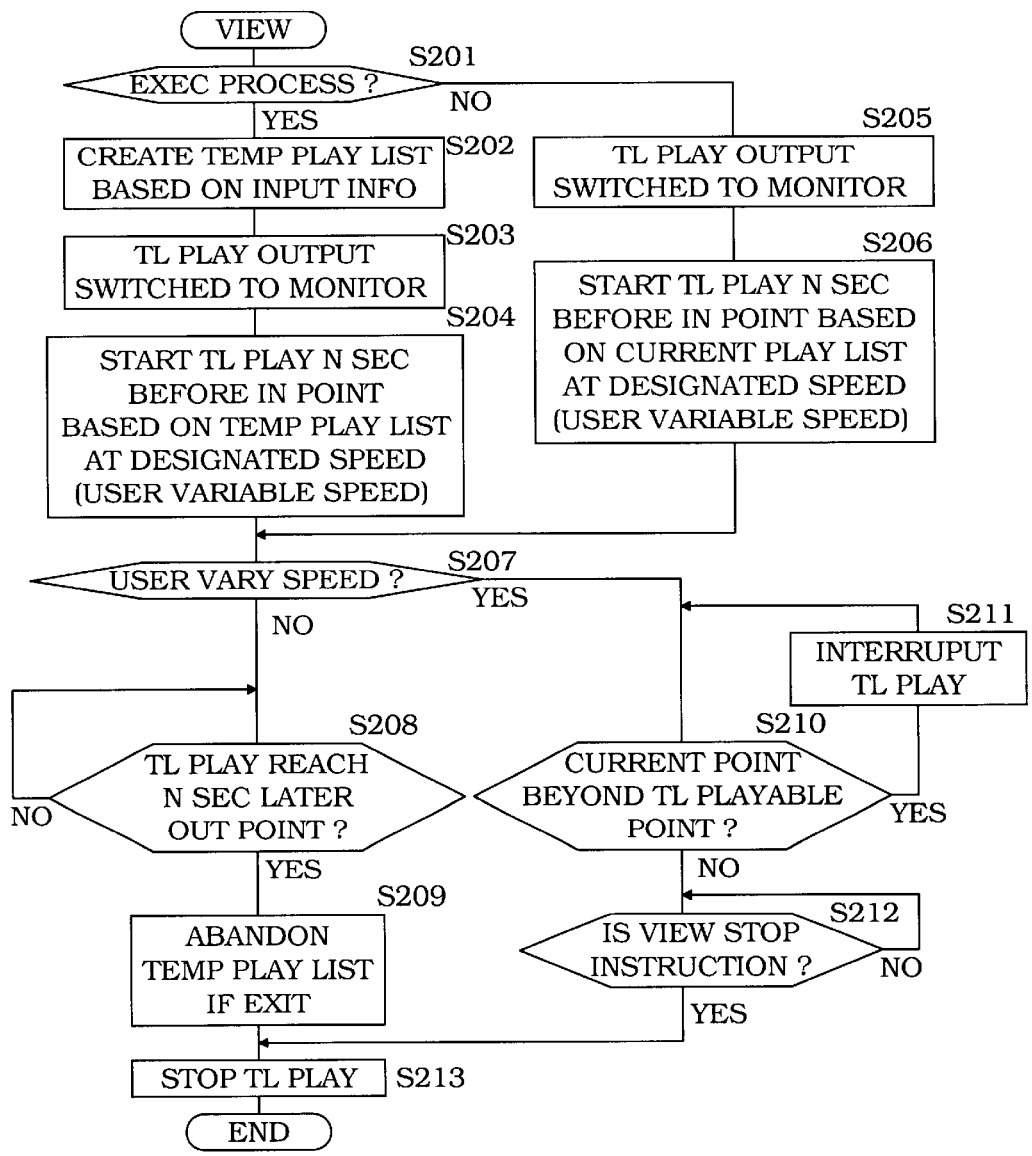
FIG. 14 shows an example flow chart of the VIEW process according to an embodiment of the present invention.

FIG. 13 shows a flow chart of the described "EXEC"process according to the present embodiment. This process and the following process of FIG. 14 are executed by the processor on the processor card 121.

The EXEC process of FIG. 13 is activated by the user pushing the EXEC button on the operation controller 18. It may also be activated by operating the button or the menu in the root window shown in FIG. 5.

Before the EXEC process, the user designates the IN and OUT points of the scene subjected to the recording from the VCR, and, in case of the normal speed recording, designates at least one of the IN and OUT points of the time line. In case of the variable speed recording, both the IN and OUT points on the time line are designated.

If the user provides the EXEC instruction (the first instruction), the system confirms the IN and OUT points of the VCR, and the IN and the OUT points on the time line based on the information input from the user (S101). Following that, it controls the VCR to start the play from N seconds before the IN point and starts the play of the time line from N seconds before the IN point (S102). Besides, the selector 96 is controlled to provide the play output of the time line to the monitor 6A (S103).

Then, the system confirms whether the slow setting exists (S104). That is, it confirms whether difference between the IN and OUT points of the VCR is different from that of the time line. If the slow setting applies, the VIEW process is activated described below (S105). If the slow setting does not apply, the system skips step S105 and advances to step S106 where it waits until the VCR play reaches the position of the front margin time dT before the IN point. When the VCR play reaches said point, it starts digitizing the play output from the VCR (S107).

Then, the system confirms whether the VIEW process is being executed (S108). If the VIEW process is being executed, the system jumps to step S133 described below. This detours around some steps of the EXEC process which conflict with the VIEW process.

If the VIEW process is not being executed, the system waits until the VCR play reaches the IN point (S109), and when that point is reached, it controls the selector 96 to provide the VCR play output to the monitor 6A (S110). The system then waits until the VCR play reaches the OUT point (S111). When the VCR play reaches the OUT point, it controls the selector 96 to provide the time line play output to the monitor 6A again (S112).

After that, the system waits until the VCR play reaches the position of the margin time dT after the OUT point (S113), and when that point is reached, it stops digitizing the VCR play output (S114). The VCR stops playing at the same time.

Then, the system again confirms whether the VIEW process is being executed (S115). If the VIEW process is being executed, it jumps to step S118 described below. If the VIEW process is not being executed, it waits until the time line play reaches the position N seconds after the OUT point (S117), and when that position is reached, it stops playing the time line and the VCR. Finally, it updates the play list to reflect the result of the EXEC process, and the present process finishes.

FIG. 14 shows an example of a flow chart of the VIEW process according to the present embodiment. This process is activated by the VIEW instruction of the user, or by the EXEC instruction with the slow setting described above.

In the VIEW process, the system first confirms whether the EXEC process is currently being executed (S201). If it is not being executed, the selector 96 is controlled to provide the time line play output to the monitor 6A (S205), and it starts playing the time line based on the current play list from the position N seconds before the IN point according to the designated speed of each scene (S206). In this case, the user is also allowed to manipulate the play at desired speed as described above. Following that, it advances to step S207 described below.

If the EXEC process is being executed at the above step S201, the system creates the temporary play list of the package according to the input information (S202). Besides, the selector 96 is controlled to provide the time line play output to the monitor 6A (S203). Then, it starts playing the time line, based on the temporary play list, from N seconds before the IN point of the time line according to the designated speed of each scene (S204). In this case, the user is allowed to manipulate the play at the desired speed.

Next, the system checks whether the user is varying play speed (S207). If so, and if there is the instruction to advance the current position beyond the time line playable point by the variable speed operation, the time line stops playing and the system waits until the operation becomes possible (S210, S211). If the user instructs the VIEW process to stop (S212, which may not only be explicit, but may also be accompanied with another instruction), it stops playing the time line (S213) and finishes the present process.

If the user does not vary the play speed at the step S207, the system waits until the time line play reaches the position N seconds after the OUT point (S208). At this position, the system disposes of the temporary play list if it exists (S209). After that, it stops playing the time line (S213) and finishes the present process.

Although the invention has been shown and described with using the preferred embodiments, it would be realized for the skilled in the art that the present invention is not limited in the above embodiments and has many other modifications according to the principle.

The present invention provides a non-linear video edit system that allows viewing of the recorded video portion during the recording from the external VCR without awaiting the completion of the recording and without interrupting the recording.

Industrial Applicability

The present invention is applicable for the manufacturing and use of a non-linear video edit system, and is especially useful for news edits or other situations in which the edit time is limited.

What is claimed is:

1. A non-linear video edit system comprising:
a nonvolatile random access recorder for storing video data,
a read and write means for independently executing write and read of the video data into/from the random access recorder,
a selector for selecting either a play output of an external sequential access recorder or a play output of the random access recorder to provide it to an external monitor for display, and
a control means for controlling the read and write means and the selector, wherein, when the system carries out an overwriting edit or an insertion edit of a played scene from the external sequential access recorder into a package of a plurality of cut scenes defined by a play list having data of the start and end positions of each video scene already stored in the random access recorder, the control means responds to a first instruction of a user by controlling the selector to switch between the play output of the random access recorder and the play output of the sequential access recorder in accordance with said play list to provide the selected play output to the monitor so as to display the edit result in real time during the writing, and the control means responds to a second instruction of the user during the writing by stopping the operation of displaying the edit result in real time without interrupting the writing, and by playing again the same edit result based on an updated temporary play list reflecting the edit result to provide it to the monitor.

2. A non-linear video edit system comprising:
a nonvolatile random access recording medium for storing digitized video data,
a writing means for writing video data to the random access recording medium,
a reading means operating independently of the writing means for reading video data from the random access recording medium, the reading means having a play output,
a control means for controlling an external sequential access recorder having a play output, the writing means and the reading means according to instructions of a user, and a selecting means, controlled by the control means, for selectively providing the play output of the sequential access recorder or the play output of the reading means to an external monitor,
wherein, when the system carries out an overwriting edit of the play output of the sequential access recorder to a video scene already stored in the random access recording medium, it receives a designation of the overwritten range and a designation of the overwriting range from the sequential access recorder to the video scene, and the writing means writes the play output of the sequential access recorder into the random access recorder,
the control means controls the sequential access recorder to start playing from a position at a predetermined time before the start point of the designated overwriting range, controls the reading means of the random access recorder to start playing from a position at said predetermined time before the designated overwritten range, and controls the selecting means to select the play output of the reading means,
after that, when the play of the sequential access recorder reaches the start point of the designated overwriting range, the control means causes the writing means to start writing the play output of the sequential access recorder into the random access recorder as a new scene different from the scene recorded in the random access recorder and controls the selecting means to select the play output of the sequential access recorder,
further after that, when the play of the sequential access recorder reaches the end point of the designated overwriting range, the control means causes the writing means 29 to stop writing and controls the selecting means to select the play output of the reading means,
further after that, when the play of the sequential access recorder reaches a position at a predetermined time after the end point of the designated overwriting range, the control means causes the reading means to stop playing and creates a play list identifying the respective scenes resulting from the overwriting of said new video scene to the video scene stored in the random access recorder on a time axis by start and end point data of the corresponding video scenes in the random access recorder without modifying the data of the video scene stored in the random access recorder,
and if the control means receives an instruction from the user to confirm the edit result before the completion of writing of the whole designated range of the sequential access recorder, it continues the writing of the play output of the sequential access recorder and creates a temporary play list reflecting said edit result, restarts reading the random access recorder from the position at said predetermined time before the start point according to the temporary play list and controls the selecting means to select the play output of the reading means.

3. A non-linear video edit system according to claim 2 wherein the control means starts the writing of the play output of the sequential access recorder from a position at a predetermined time before the start point of said designated range and finishes the writing of the play output of the sequential access recorder at a position at a predetermined time after the end point of said designated range.

4. A non-linear video edit system according to claim 2 wherein when the random access recorder is played according to the edit result confirmation instruction, the control means allows the user a variable speed play.

5. A non-linear video edit system according to claim 4 wherein if the user try to play beyond the position currently written into said random access recorder, the control means suspends the advance of the play until it will be playable.

6. A non-linear video edit system according to claim 2 wherein the control means plays the sequential access recorder at the normal speed while writing it into the random access recorder, creates said temporary play list regardless of the edit result confirmation instruction to restart playing by the reading of the random access recorder from the position at said predetermined time before the start point and controls the selecting means to select the play output of said reading means so that the slow play scene is played at the designated slow speed.

7. A non-linear video edit system according to claim 6 wherein when the random access recorder is played during the overwriting edit of the slow play output, the control means allows the user a variable speed play.

8. A non-linear video edit system according to claim 7 wherein if the user try to play beyond the position currently written into said random access recorder, the control means suspends the advance of the play until it will be playable.

9. A non-linear video edit system comprising:

a nonvolatile random access recording medium for storing digitized video data, a writing means for writing video data to the random access recording medium, a reading means operating independently of the writing means for reading video data from the random access recording medium, the reading means having a play output, a control means for controlling an external sequential access recorder having a play output, the writing means and the reading means according to instructions of a user, and a selecting means, controlled by the control means, for selectively providing the play output of the sequential access recorder or the play output of the reading means to an external monitor, wherein, when the system carries out an insertion edit of the play output of the sequential access recorder to a video scene already stored in the random access recording medium, it receives a designation of the insertion point and a designation of the inserted range from the sequential access recorder to the video scene, and the writing means writes the play output of the sequential access recorder into the random access recorder, the control means controls the sequential access recorder to start playing from a position at a predetermined time before the start point of the designated range, controls the reading means of the random access recorder to start playing from a position at said predetermined time before the designated insertion point, and controls the selecting means to select the play output of the reading means, after that, when the play of the sequential access recorder reaches the start point of the designated range, the control means controls the writing means to start writing the play output of the sequential access recorder into the random access recorder as a new scene different from the scene recorded in the random access recorder and controls the selecting means to select the play output of the sequential access recorder, further after that, when the play of the sequential access recorder reaches the end point of the designated inserted range, the control means controls the writing means to stop writing and controls the selecting means to select the play output of the reading means, further after that, when the play of the sequential access recorder reaches a position at a predetermined time after the end point of the designated inserted range, the control means controls the reading means to stop playing and creates a play list identifying the respective scenes resulting from the insertion of said new video scene to the video scene stored in the random access recorder on a time axis by start and end point data of the corresponding video scenes in the random access recorder without modifying the data of the video scene stored in the random access recorder, and if the control means receives an instruction from the user to confirm the edit result before the completion of writing of the whole designated inserted range of the sequential access recorder, it continues the writing of the play output of the sequential access recorder and creates a temporary play list reflecting said edit result, restarts reading the random access recorder from the position at said predetermined time before the start point according to the temporary play list and controls the selecting means to select the play output of the reading means.

10. A non-linear video edit system according to claim 9 wherein the control means starts the writing of the play output of the sequential access recorder from a position at a predetermined time before the start point of said designated range and finishes the writing of the play output of the sequential access recorder at a position at a predetermined time after the end point of said designated range.

11. A non-linear video edit system according to claim 9 wherein when the random access recorder is played according to the edit result confirmation instruction, the control means allows the user a variable speed play.

12. A non-linear video edit system according to claim 11 wherein if the user try to play beyond the position currently written into said random access recorder, the control means suspends the advance of the play until it will be playable.

13. A non-linear video edit system according to claim 9 wherein the control means plays the sequential access recorder at the normal speed while writing it into the random access recorder, creates said temporary play list regardless of the edit result confirmation instruction to restart playing by the reading of the random access recorder from the position at said predetermined time before the start point and causes the selecting means to select the play output of said reading means so that the slow play scene is played at the designated slow speed.

14. A non-linear video edit system according to claim 13 wherein when the random access recorder is played during the insertion edit of the slow play output, the control means allows the user a variable speed play.

15. A non-linear video edit system according to claim 14 wherein if the user try to play beyond the position currently written into said random access recorder, the control means suspends the advance of the play until it will be playable.

* * * * *